United States Patent
Inoue et al.

(10) Patent No.: US 10,283,155 B2
(45) Date of Patent: May 7, 2019

(54) MAGNETIC RECORDING MEDIUM AND MAGNETIC RECORDING AND REPRODUCING APPARATUS

(71) Applicant: SHOWA DENKO K.K., Tokyo (JP)

(72) Inventors: Ken Inoue, Chiba (JP); Kota Hasegawa, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 372 days.

(21) Appl. No.: 15/361,658

(22) Filed: Nov. 28, 2016

(65) Prior Publication Data

US 2017/0221515 A1    Aug. 3, 2017

(30) Foreign Application Priority Data

Jan. 29, 2016    (JP) ................. 2016-015486

(51) Int. Cl.
    *G11B 5/66*    (2006.01)
(52) U.S. Cl.
    CPC ..................... *G11B 5/66* (2013.01)
(58) Field of Classification Search
    CPC .................... G11B 5/66; G11B 5/667
    See application file for complete search history.

(56) References Cited

U.S. PATENT DOCUMENTS 8,247,094 B2    8/2012    Sasaki
8,475,947 B2    7/2013    Sato et al.
2012/0028077 A1*    2/2012    Watanabe ............... G11B 5/66
                                                                428/827
2018/0197570 A1*    7/2018    Ikeda ...................... G11B 5/667

FOREIGN PATENT DOCUMENTS

JP    2008-243316    10/2008
JP    2008-287853    11/2008
JP    2009-087500    4/2009

OTHER PUBLICATIONS

Shintaro Hinata et al., Evaluation of Anisotropy Field and g-factor of c-plane Oriented CoPtCr Alloy Film Using Q-band Ferromagnetic Resonance, J. Magn. Soc. Jpn., 34 214-219 (2010).

* cited by examiner

*Primary Examiner* — Holly C Rickman
(74) *Attorney, Agent, or Firm* — IPUSA, PLLC

(57) ABSTRACT

A magnetic recording medium includes a non-magnetic substrate on which at least a soft magnetic underlayer, an orientation control layer, a perpendicular magnetic layer, and a protective layer are disposed. The perpendicular magnetic layer includes first to fourth magnetic layers. A first exchange coupling control layer is disposed between the first magnetic layer and the second magnetic layer. A second exchange coupling control layer is disposed between the second magnetic layer and the third magnetic layer. Following relations are satisfied where $Ku_i$ is a magnetic anisotropic constant of an i-th magnetic layer, $Ms_i$ is a saturation magnetization of the i-th magnetic layer, and $t_i$ is a film thickness of the i-th magnetic layer, $Ku_1 > Ku_2$, $Ku_2 > Ku_3$, $Ms_1 \times t_1 > Ms_2 \times t_2$, $Ms_2 \times t_2 > Ms_3 \times t_3$, $Ku_3 < Ku_4$, and $Ms_3 \times t_3 < Ms_4 \times t_4$.

6 Claims, 4 Drawing Sheets

MAGNETIC RECORDING MEDIUM AND MAGNETIC RECORDING AND REPRODUCING APPARATUS

CROSS-REFERENCE TO RELATED APPLICATIONS

The present application claims the benefit of priority under 35 U.S.C. § 119 of Japanese Patent Application No. 2016-015486 filed on Jan. 29, 2016, the contents of which are incorporated herein by reference in their entirety.

BACKGROUND OF THE INVENTION

1. Field of the Invention

The disclosures herein generally relate to a magnetic recording medium and a magnetic recording and reproducing apparatus.

2. Description of the Related Art

Currently, a hard disk drive (HDD) that is a type of magnetic recording and reproducing apparatus has been exponentially increasing its recording density, and the recording density is said to be likely to continue to increase in the future. Therefore, a magnetic head and a magnetic recording medium suitable for recording density growth have been developed.

A magnetic recording medium, mounted on the magnetic recording and reproducing apparatus commercially available at present, is a so-called perpendicular (vertical) magnetic recording medium in which an easy axis of magnetization within a magnetic film is oriented mainly perpendicularly. The perpendicular magnetic recording medium can prevent noise from increasing because the perpendicular magnetic recording medium is less subject to a diamagnetic field in a boundary region between recording bits when increasing the recording density and a clear bit boundary is formed. Moreover, because a decrease in recording bit volume along with the recording density growth can be lessened, the perpendicular magnetic recording medium is resistant to a thermal fluctuation effect. In light of this, there is proposed a structure of a medium suitable for the perpendicular magnetic recording, this structure attracting remarkable attention in recent years.

In order to increase the recording density of the magnetic recording medium, it is necessary to facilitate magnetic separation of crystal particles that constitute a magnetic recording layer and to reduce a unit of magnetization reversal. However, this leads to a decrease of thermal stability of the magnetic recording medium. Therefore, in order to maintain the thermal stability of the magnetic recording medium, it is necessary to increase a magnetic anisotropic constant (Ku) of a magnetic material that constitutes the magnetic particle.

In order to constitute such a magnetic recording medium, it is preferable that the magnetic recording layer has (adopts) a granular structure using the magnetic material having high Ku. However, the magnetic recording medium, using the magnetic material having high Ku, has problem points that strength of a magnetic field required in recording increases and a write-ability (easiness of recording) of the magnetic recording medium decreases.

In order to solve the problem points, a configuration, in which a plurality of magnetic recording layers are layered via exchange coupling control layers to ferromagnetically couple the magnetic particles that constitute each layer, is known in the related art. In the plurality of magnetic recording layers of the configuration, magnetization of magnetic particles having low Ku is reversed previously, and magnetization of magnetic particles having higher Ku is reversed. That is, in a case where the plurality of magnetic recording layers are layered without the exchange coupling control layers, the magnetization of these magnetic recording layers is simultaneously reversed and the write-ability of the magnetic recording layers decreases. On the other hand, the write-ability of the magnetic recording medium can be enhanced by using the above described structure (for example, see Patent Documents 1 to 3).

Also, Non-Patent Document 1 discloses an anisotropy field Hk and a saturation magnetization Ms of a CoCrPt alloy film.

There are no bounds to the request for high recording densification of a magnetic recording medium, and the magnetic recording medium is required to have highly improved thermal fluctuation characteristics and highly improved write-ability more than ever. In order to fulfill such a request, in the magnetic recording medium, the number of magnetic recording layers increases. In accordance with the increase of the number of magnetic recording layers, the number of exchange coupling control layers, which control ferromagnetic coupling between the respective magnetic recording layers, increases.

According to examination by the present inventors, it is found that ATI/FTI (ATI: Adjacent Track Interference, FTI: Far Track Interference) tolerability of the magnetic recording medium degrades when the number of exchange coupling control layers increases in the laminated structure of the magnetic recording medium. It is considered that this is because, when the number of exchange coupling layers increases, a magnetization reversal area of the lower layer side of the magnetic recording layers expands particularly, and a bit boundary is disordered. As a result, the ATI/FTI tolerability of the magnetic recording medium degrades. Further, it is considered that because a main magnetic volume of the magnetic head realizing the high recording densification is small, a recording magnetic field leaks from other positions of the magnetic pole, and the leaked magnetic field deteriorates information of a recording track adjacent to the magnetic pole position where the magnetization reversal easily occurs in a weak magnetic field.

RELATED-ART DOCUMENTS

Patent Documents

[Patent Document 1] Japanese Unexamined Patent Application Publication No. 2008-243316
[Patent Document 2] Japanese Unexamined Patent Application Publication No. 2008-287853
[Patent Document 3] Japanese Unexamined Patent Application Publication No. 2009-87500

Non-Patent Documents

[Non-Patent Document 1] J. Magn. Soc. Jpn., 34 214-219 (2010)

SUMMARY OF THE INVENTION

It is a general object of at least one embodiment of the present disclosure to provide a magnetic recording medium and a magnetic recording and reproducing apparatus that substantially obviates one or more problems caused by the limitations and disadvantages of the related art.

According to one aspect of the present embodiment, a magnetic recording medium includes a non-magnetic substrate on which at least a soft magnetic underlayer, an orientation control layer that controls an orientation of a layer that is located directly on the orientation control layer, a perpendicular magnetic layer having a magnetization easy axis that is mainly oriented perpendicular to the non-magnetic substrate, and a protective layer are disposed. The perpendicular magnetic layer includes a first magnetic layer, a second magnetic layer, a third magnetic layer, and a fourth magnetic layer from a side of the substrate in this order. The first magnetic layer, the second magnetic layer, the third magnetic layer, and the fourth magnetic layer are magnetic layers having a granular structure. Magnetic particles, which constitute the first magnetic layer, the second magnetic layer, the third magnetic layer, and the fourth magnetic layer, are continuous columnar crystals. A first exchange coupling control layer is disposed between the first magnetic layer and the second magnetic layer. A second exchange coupling control layer is disposed between the second magnetic layer and the third magnetic layer. The third magnetic layer and the fourth magnetic layer are in contact with each other. The first magnetic layer, the second magnetic layer, the third magnetic layer, and the fourth magnetic layer are coupled ferromagnetically. Following relations are satisfied where $Ku_i$ is a magnetic anisotropic constant of an i-th magnetic layer, $Ms_i$ is a saturation magnetization of the i-th magnetic layer, and $t_1$ is a film thickness of the i-th magnetic layer, $$Ku_1 > Ku_2,$$

$$Ku_2 > Ku_3,$$

$$Ms_1 \times t_1 > Ms_2 \times t_2,$$

$$Ms_2 \times t_2 > Ms_3 \times t_3,$$

$$Ku_3 < Ku_4, \text{ and}$$

$$Ms_3 \times t_3 < Ms_4 \times t_4.$$

DESCRIPTION OF THE PREFERRED EMBODIMENTS

In the following, embodiments of the present disclosure will be described with reference to the accompanying drawings. An object of the embodiment is to provide a magnetic recording medium having high thermal fluctuation characteristics and a high write-ability (easiness of recording) even when the number of magnetic recording layers increases.

The present inventors have made earnest studies to solve the above problems. As a result, the present inventors have accomplished a magnetic recording medium that can realize high thermal fluctuation characteristics and a high write-ability (easiness of recording). Here, an embodiment of the present invention relates to a magnetic recording medium, in which at least an orientation control layer that controls an orientation of a layer that is located directly on the orientation control layer, a perpendicular magnetic layer having a magnetization easy axis that is mainly oriented perpendicular to a non-magnetic substrate, and a protective layer are disposed on the non-magnetic substrate, and relates to a magnetic recording and reproducing apparatus that records and reproduces information in and from the magnetic recording medium.

In the following, a magnetic recording medium and a magnetic recording medium and reproducing apparatus according to the embodiment of the present invention will be described in detail.

Figure 1:
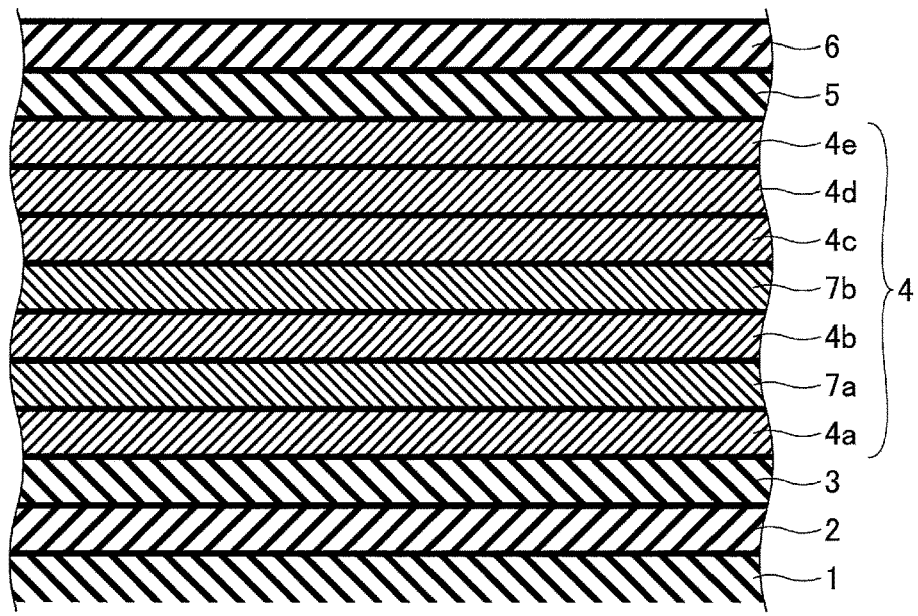
FIG. 1 is a schematic drawing illustrating a magnetic recording medium according to an embodiment of the present invention.

FIG. 1 is a vertical cross-sectional view illustrating an example of a structure of the magnetic recording medium according to the embodiment of the present invention. The magnetic recording medium illustrated in FIG. 1 has a structure including a soft magnetic underlayer 2, an orientation control layer 3, a perpendicular magnetic layer (vertical magnetic layer) 4, a protective layer 5, and a lubricant layer 6 that are sequentially formed (layered) on a non-magnetic substrate 1. The perpendicular magnetic layer 4 includes a first magnetic layer 4a, a second magnetic layer 4b, a third magnetic layer 4c, a fourth magnetic layer 4d, and a fifth magnetic layer 4e in this order from the non-magnetic substrate 1 side. The perpendicular magnetic layer 4 includes a first exchange coupling control layer 7a between the first magnetic layer 4a and the second magnetic layer 4b and includes a second exchange coupling control layer 7b between the second magnetic layer 4b and the third magnetic layer 4c. Crystal particles (crystal grains) constituting the first magnetic layer 4a, the second magnetic layer 4b, the third magnetic layer 4c, the fourth magnetic layer 4d, and the fifth magnetic layer 4e are columnar crystals continuing from the lower layer to the upper layer. The respective magnetic layers 4a to 4e are ferromagnetically coupled.

A metal substrate made of a metal material such as aluminum, an aluminum alloy, or the like may be used as the non-magnetic substrate 1. A non-metallic substrate made of a non-metallic material such as glass, ceramics, silicon, silicon carbide, carbon, or the like may be used as the non-magnetic substrate 1.

Further, a metal substrate or a non-metal substrate having a NiP layer or a NiP alloy layer formed on a surface of the above metal substrate or the above non-metal substrate by using a plating method or a sputtering method may be used as the non-magnetic substrate 1.

It is preferable to provide an adhesion layer between the non-magnetic substrate 1 and the soft magnetic underlayer 2. When the non-magnetic substrate 1 contacts the soft magnetic underfilm mainly composed of Co or Fe, corrosion is liable to advance due to an adsorption gas on the surface of the non-magnetic substrate 1, an influence of moisture, diffusion of a substrate component or the like. By providing the adhesion layer between the non-magnetic substrate 1 and the soft magnetic underlayer 2, the corrosion can be prevented (controlled). For example, Cr, a Cr alloy, Ti, a Ti alloy, or the like can be appropriately selected as a material of the adhesion layer. It is preferable that the thickness of the adhesion layer is equal to or thicker than 30 Å.

The soft magnetic underlayer 2 is provided to increase a component of magnetic flux, generated from the magnetic head, perpendicular to the substrate, and also to more firmly fix a direction of magnetization of the perpendicular magnetic layer 4, in which information is recorded, in the direction perpendicular to the non-magnetic substrate 1. This action is preferable because it becomes more noticeable when a single magnetic pole head for the perpendicular recording is used as a magnetic head for recording and reproduction.

The soft magnetic underlayer 2 is made of a soft magnetic material. For example, a soft magnetic material including Fe, Ni, and Co may be used as the soft magnetic underlayer 2.

For example, a CoFe based alloy (CoFeTaZr, CoFeZrNb or the like), a FeCo based alloy (FeCo, FeCoV or the like), a FeNi based alloy (FeNi, FeNiMo, FeNiCr, FeNiCr, FeNiSi or the like), a FeAl based alloy (FeAl, FeAlSi, FeAlSiCr, FeAlSiTiRu, FeAlO or the like), a FeCr based alloy (FeCr, FeCrTi, FeCrCu or the like) a FeTa based alloy (FeTa, FeTaC, FeTaN or the like), a FeMg based alloy (FeMgO or the like), a FeZr based alloy (FeZrN or the like), a FeC based alloy, a FeN based alloy, a FeSi based alloy, a FeP based alloy, a FeNb based alloy, a FeHf based alloy, a FeB based alloy, or the like may be used as this material.

It is preferable that a coercive force Hc of the soft magnetic underlayer 2 is made to be 100 (Oe) or lower (more preferably 20 (Oe) or lower). Here, 1 Oe is equal to 79 A/m.

It is undesirable that the coercive force Hc of the soft magnetic underlayer 2 exceeds the above range. This is because if the coercive force Hc exceeds the above range, soft magnetic characteristics become insufficient and a reproduced waveform changes from a so-called rectangle wave into a waveform having a distortion.

It is preferable that a saturation magnetic flux density Bs of the soft magnetic underlayer 2 is made to be 0.6 T or higher (more preferably 1 T or higher). It is undesirable that that the saturation magnetic flux density Bs of the soft magnetic underlayer 2 is lower than the above range. This is because if the saturation magnetic flux density Bs is lower than the above range, the reproduced waveform changes from a so-called rectangle wave into a waveform having a distortion.

Further, it is preferable that the product Bs·t (T·nm) of the saturation magnetic flux density Bs (T) of the soft magnetic underlayer 2 and a film thickness t (nm) of the soft magnetic underlayer 2 is 15 (T·nm) or higher (more preferably, 25 (T·nm) or higher). It is undesirable that the product Bs·t is less than the above range. This is because the reproduced waveform has a distortion and OW (Overwrite) characteristics (recording characteristics) get worse if the product Bs·t is less than the above range.

It is preferable that the soft magnetic underlayer 2 is constituted of two-layered soft magnetic films, and Ru is provided between the two-layered soft magnetic films. By adjusting the film thickness of Ru in a predetermined range of 0.4 nm to 1.0 nm, or 1.6 nm to 2.6 nm, the two-layered soft magnetic films become an AFC (AntiFerromagnetic Coupling) structure. When the soft magnetic underlayer 2 has the AFC structure, so-called spike noise can be prevented.

The orientation control layer 3, formed on the soft magnetic underlayer 2, can improve recording and reproducing characteristics by micronizing crystal particles of the perpendicular magnetic layer 4. As the material of this orientation control layer 3, materials having an hcp structure, a fcc structure, or an amorphous structure are preferable, though no particular limitation is imposed on the material. In particular, a Ru based alloy, a Ni based alloy, a Co based alloy, a Pt based alloy, or a Cu based alloy is preferable. Also, these alloys may be multilayered. For example, it is preferable to adopt a multilayer structure having a Ni based alloy and a Ru based alloy in this order from the substrate side, a multilayer structure having a Co based alloy and a Ru based alloy, or a multilayer structure having a Pt based alloy and a Ru based alloy.

Thus, in the magnetic recording medium according to the embodiment, it is preferable that the thickness of the orientation control layer 3 is made to be in a range of from 5 nm to 40 nm, and more preferably in a range of from 8 nm to 30 nm. In a case where the orientation control layer 3 has a plurality of layers, it is preferable that a total thickness of the layers is made to be in the range of from 5 nm to 40 nm, and more preferably in the range of from 8 nm to 30 nm. When the thickness of the orientation control layer 3 is in the range of 5 nm to 40 nm (8 nm to 30 nm preferably), a perpendicular orientation property of the perpendicular magnetic layer 4 becomes particularly higher and it becomes possible to reduce a distance between the magnetic head and the soft magnetic underlayer 2 during recording. Accordingly, it becomes possible to increase the recording and reproducing characteristics without decreasing the resolution of a reproducing signal.

The magnetic recording medium according to the embodiment has the following features. The perpendicular magnetic layer 4 includes the first magnetic layer 4a, the second magnetic layer 4b, the third magnetic layer 4c, and the fourth magnetic layer 4d from the non-magnetic substrate 1 side. The first to fourth magnetic layers 4a to 4d are magnetic layers having a granular structure. Magnetic particles, which constitute the first to fourth magnetic layers 4a to 4d, are continuous columnar crystals. The perpendicular magnetic layer 4 includes the exchange coupling control layer 7a between the first magnetic layer 4a and the second magnetic layer 4b. The perpendicular magnetic layer 4 includes the exchange coupling control layer 7b between the second magnetic layer 4b and the third magnetic layer 4c. The third magnetic layer 4c and the fourth magnetic layer 4d are in contact with each other. The first to fourth magnetic layers 4a to 4d are coupled ferromagnetically. The following relations are satisfied where $Ku_i$ is a magnetic anisotropic constant of an i-th magnetic layer, $Ms_i$ is a saturation magnetization of the i-th magnetic layer, and $t_1$ is a film thickness of the i-th magnetic layer, $Ku_1 > Ku_2$, $Ku_2 > Ku_3$, $Ms_1 \times t_1 > Ms_2 \times t_2$, $Ms_2 \times t_2 > Ms_3 \times t_3$, $Ku_3 < Ku_4$, and $Ms_3 \times t_3 < Ms_4 \times t_4$.

In the related art, a perpendicular magnetic layer is structured with a plurality of magnetic layers, and exchange coupling control layers are disposed between the respective magnetic layers to control coupling between the respective magnetic layers. Then, the perpendicular magnetic layer has a structure in which a magnetic anisotropic constant Ku and a product MS·t of a saturation magnetization Ms and a film thickness t of each magnetic layer decrease gradually from the non-magnetic substrate side toward the protective layer side. On the other hand, according to the embodiment, although the perpendicular magnetic layer 4 has such a structure from the first magnetic layer 4a to the third magnetic layer 4c, the third magnetic layer 4c and the fourth magnetic layer 4d are joined (coupled) without disposing the exchange coupling control layer. Further, according to the embodiment, the perpendicular magnetic layer 4 has a structure in which Ku and the product MS·t of the fourth magnetic layer 4d are increased relative to Ku and the product MS·t of the third magnetic layer 4c. In this way, it becomes possible to solve the problem points caused by heavy use of the exchange coupling control layers and to provide the magnetic recording medium having excellent ATI/FTI resistance (tolerability). The present inventors think that this is because the magnetization reversal of the multi-layered perpendicular magnetic layer proceeds smoothly by performing, on the third magnetic layer 4c directly, the magnetization reversal of the fourth magnetic layer 4d by use of the magnetic head, to sequentially advance the magnetization reversal of the third magnetic layer 4c, the magnetization reversal of the second magnetic layer 4b, and the first magnetic layer 4a that are weakly coupled using the exchange coupling control layers.

Figure 2:
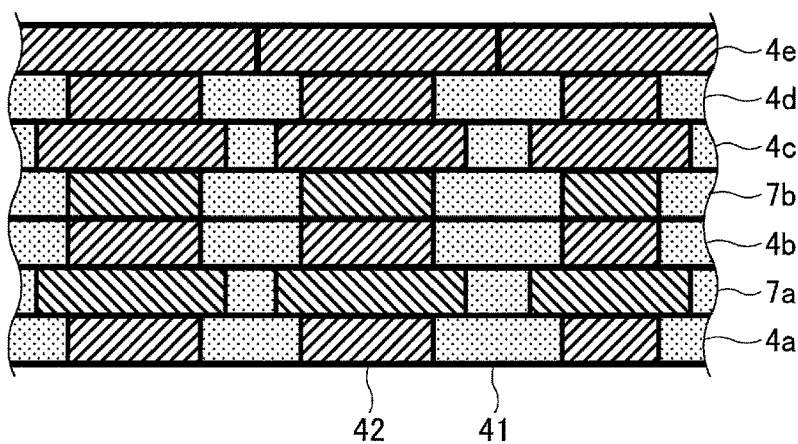
FIG. 2 is a schematic diagram illustrating a structure of magnetic layers and exchange coupling control layers according to the embodiment of the present invention.

The perpendicular magnetic layer 4 according to the embodiment is described with reference to FIG. 2. FIG. 2 schematically illustrates a cross-sectional view of the perpendicular magnetic layer 4 with respect to a substrate surface.

According to the embodiment, the first to fourth magnetic layers 4a to 4d, constituting the perpendicular magnetic layer 4, may be made of materials containing CoCrPt based magnetic particles and oxides 41, for example. Here, the oxide 41 is preferably an oxide of Cr, Si, Ta, Al, Ti, Mg Co, B or Ru. Also, a composite oxide obtained by combining two or more oxides may be used.

It is preferable that the magnetic particles 42 are dispersed in the first to fourth magnetic layers 4a to 4d. It is preferable that the magnetic particles 42 form a columnar structure penetrating through the magnetic layers 4a, the second magnetic layer 4b, the third magnetic layer 4c, and further the magnetic layer 4d vertically as illustrated in FIG. 2. By forming such a structure, the orientation and the crystallinity of the magnetic particles 42 of the perpendicular magnetic layer 4 can be improved. As a result, a signal/noise ratio (S/N ratio) suitable for the high density recording can be obtained.

In order to obtain such a structure, the amount of the oxides 41 to be contained and film foutiing conditions of the first to fourth magnetic layers 4a to 4d are important.

The content of the oxides 41 is preferably 3 mol % or more and 18 mol % or less relative to the total mol obtained by calculating the alloy of Co, Cr, Pt and the like, constituting the magnetic particles 42, as one compound, for example. The content of the oxides 41 is more preferably 6 mol % or more and 13 mol % or less.

The above range is preferable as the content of the oxides in the first magnetic layer 4a because the oxides precipitate around the magnetic particles to allow the magnetic particles 42 to be isolated and micronized when the layer is formed as illustrated in FIG. 2. It is undesirable that the content of the oxides exceeds the above range. This is because if the content exceeds the above range, the oxides remain in the magnetic particles, impairing the orientation and crystallinity of the magnetic particles, and also, the oxides precipitate on the top and bottom of the magnetic particles. As a result, the columnar structure, in which the magnetic particles penetrate vertically through the magnetic layers, is not formed. Also, it is undesirable that the content of the oxides is less than the above range. If the content is less than the above range, the magnetic particles are insufficiently separated and micronized. As a result, a noise during the recording and reproducing is increased and therefore, a signal/noise ratio (S/N ratio) suitable for high density recording cannot be obtained.

Figure 3:
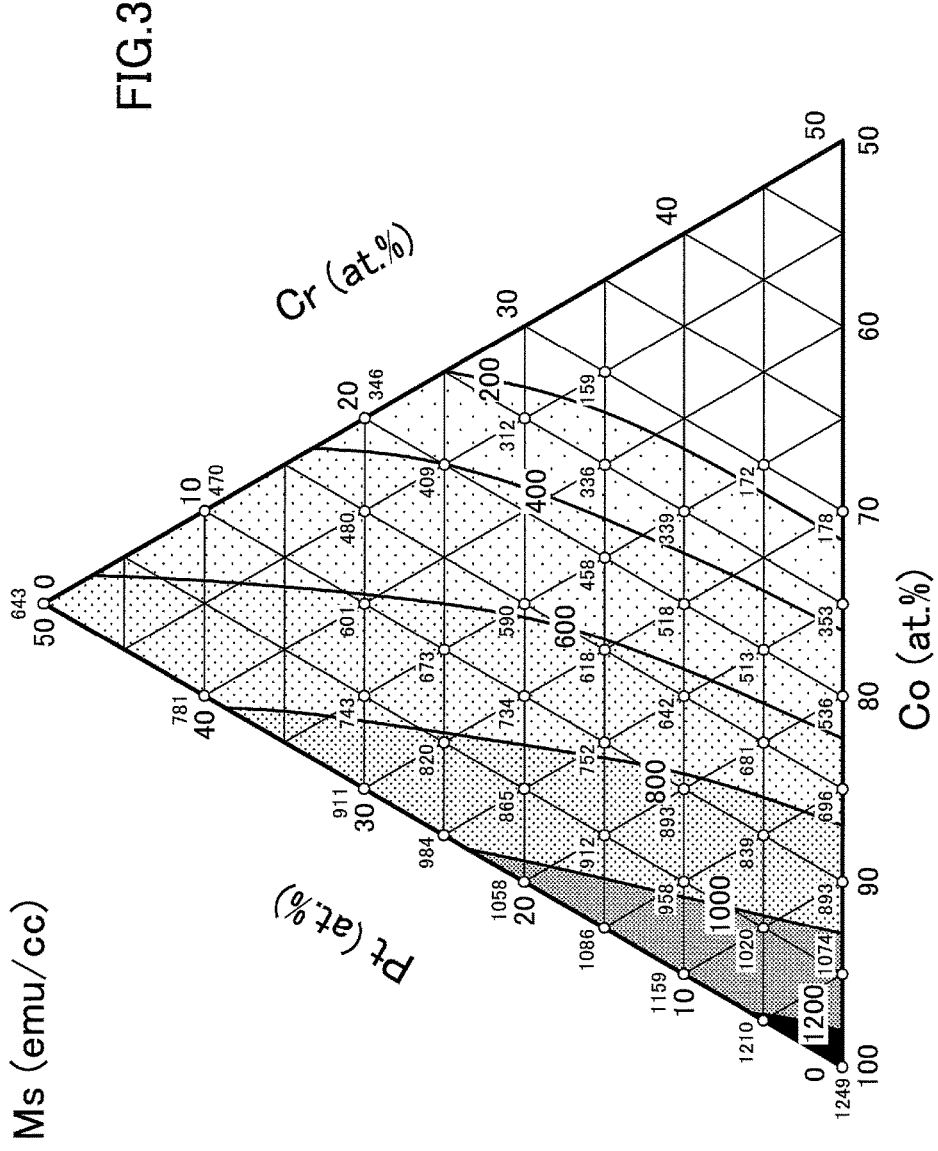
FIG. 3 is a diagram illustrating a relationship between a composition ratio and a saturation magnetization Ms of CoCrPt based magnetic particles at an ambient temperature.
Figure 4:
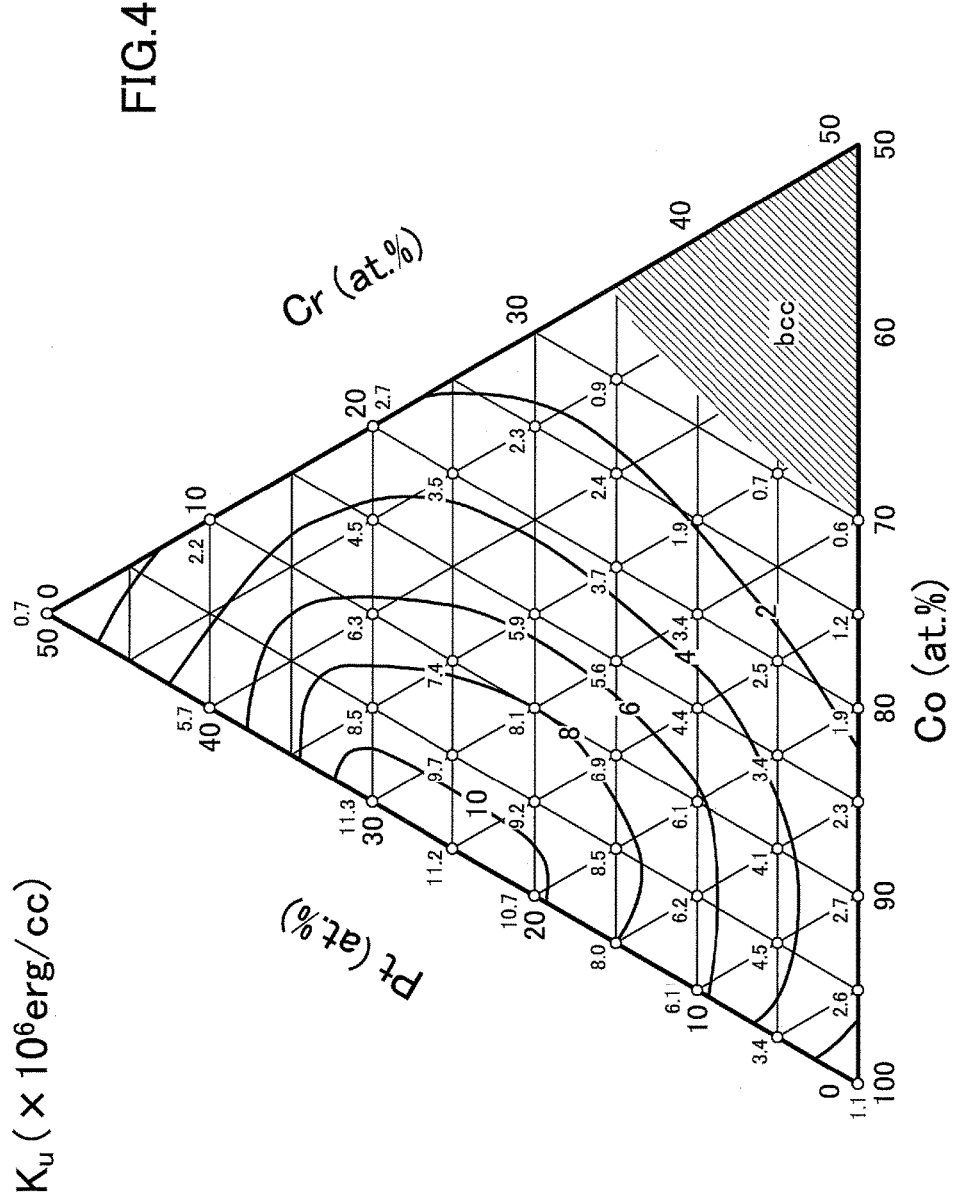
FIG. 4 is a diagram illustrating a relationship between a composition ratio and a magnetic anisotropic constant Ku of the CoCrPt based magnetic particles at an ambient temperature.

In the embodiment, although it is required that the magnetic anisotropic constant Ku of the first to fourth magnetic layers 4a to 4d, the saturation magnetization Ms of the first to fourth magnetic layers 4a to 4d, and the film thickness t of the first to fourth magnetic layers 4a to 4d are made to be in predetermined ranges, it is possible to form the magnetic layers with reference to materials illustrated in FIGS. 3 and 4 when CoCrPt based magnetic particles are used, for example (for example, see Non-Patent Document 1). Here, FIG. 3 illustrates a relationship between a composition ratio and a saturation magnetization Ms of the CoCrPt based magnetic particles at an ambient temperature, and FIG. 4 illustrates a relationship between the composition ratio and a magnetic anisotropic constant Ku of the CoCrPt based magnetic particles at an ambient temperature.

In the first magnetic layer 4a according to the embodiment, it is preferable that $Ms_1$ is in a range of from 1200 to 500 emu/cc and $Ku_1$ is in a range of from $12 \times 10^6$ to $5 \times 10^6$ erg/cc. In the second magnetic layer 4b according to the embodiment, it is preferable that $Ms_2$ is in a range of from 1100 to 400 emu/cc and $Ku_t$ is in a range of from $11 \times 10^6$ to $4 \times 10^6$ erg/cc. In the third magnetic layer 4c according to the embodiment, it is preferable that $Ms_3$ is in a range of from 1000 to 300 emu/cc and $Ku_3$ is in a range of from $10 \times 10^6$ to $4 \times 10^6$ erg/cc. In the fourth magnetic layer 4d according to the embodiment, it is preferable that $Ms_4$ is in a range of from 900 to 200 emu/cc and $Ku_4$ is in a range of from $9 \times 10^6$ to $2 \times 10^6$ erg/cc. It is preferable that the film thickness $t_1$ in the first magnetic layer 4a, the film thickness $t_2$ in the second magnetic layer 4b, the film thickness $t_3$ in the third magnetic layer 4c, and the film thickness $t_4$ in the fourth magnetic layer 4d are in a range of from 1 nm to 10 nm.

By making the magnetic anisotropic constants Ku, the saturation magnetizations Ms, and the film thicknesses t of the first to fourth magnetic layers 4a to 4d to be in the above ranges, it becomes possible to realize the magnetic recording medium, in which the perpendicular magnetic layer is multilayered, having higher thermal fluctuation characteristics and higher write-ability (easiness of recording). It is undesirable that the value of Ku or Ms is equal to or less than the above range because this results in easy occurrence of a magnetization reversal, giving rise to problems concerning a reduction in Hn and deterioration in thermal fluctuation characteristics. If the value of Ku or Ms exceeds the above range, it is difficult to easily undergo the magnetization reversal against the magnetic field of the head, and the write-ability (easiness of recording) decreases. Further, if the film thickness t is thinner than the above range, a sufficient reproduction output cannot be obtained and the thermal fluctuation characteristics decrease. Also, it is undesirable that the film thickness t exceeds the above range. This is because if the film thickness t exceeds the above range, the magnetic particles in the perpendicular magnetic layer enlarge, noise during recording and reproducing increases, and recording and reproducing characteristics degrade.

As the materials suitable for the first to fourth magnetic layers 4a to 4d, for example, $(CoCrPt)-(SiO_2)$, (Co- CrPtNb)—(Cr$_2$O$_3$), (CoCrPt)—(Ta$_2$O$_5$), (CoCrPt)—(Cr$_2$O$_3$)—(TiO$_2$), (CoCrPt)—(Cr$_2$O$_3$)—(SiO$_2$) (CoCrPt)—(Cr$_2$O$_3$)—(SiO$_2$)—(TiO$_2$), (CoCrPtMo)—(TiO$_2$), (CoCrPtW)—(TiO$_2$), (CoCrPtB)—(Al$_2$O$_3$), (CoCrPtTaNd)—(MgO), (CoCrPtBCu)—(Y$_2$O$_3$), (CoCrPtRu)—(SiO$_2$), or the like may be used.

According to the embodiment, the exchange coupling control layer 7a is disposed between the first magnetic layer 4a and the second magnetic layer 4b, and the exchange coupling control layer 7b is disposed between the second magnetic layer 4b and the third magnetic layer 4c. By providing the exchange coupling control layers 7a and 7b, the magnetization reversal of the first magnetic layer 4a, the second magnetic layer 4b, and the third magnetic layer 4c can be facilitated and the dispersion of the magnetization reversal of the entire magnetic particles can be reduced. As a result, it becomes possible to further improve the S/N ratio.

It is preferable to use materials having a hcp structure for the exchange coupling control layers 7a and 7b. For example, it is preferable to use Ru, an Ru alloy, RuCo, a CoCr alloy or a CoCrX1 alloy (X1: one or two or more types selected from Pt, Ta, Zr, Re, Ru, Cu, Nb, Ni, Mn, Ge, Si, O, N, W, Mo, Ti, V, Zr and B).

It is required that a thickness of each of the exchange coupling control layers 7a and 7b is in a range so as not to completely cut the ferromagnetic coupling of the first magnetic layer 4a, the second magnetic layer 4b, and the third magnetic layer 4c. When the ferromagnetic coupling of the perpendicular magnetic layer is cut, the M-H loop is changed to a loop reversing in two steps, and therefore, this can be easily discriminated. When this two-stage loop arises, this means that the magnetic grains are not simultaneously reversed with respect to the magnetic field from the head, resulting in a significant deterioration in S/N ratio during reproducing and a reduction in resolution. It is preferable that the thickness of each of the exchange coupling control layers 7a and 7b is made to be 0.1 nm or more and 2 nm or less, and more preferably, 0.1 nm or more and 0.8 nm or less.

According to the embodiment, the fifth magnetic layer 4e is disposed between the fourth magnetic layer 4d and the protective layer 5. The fifth magnetic layer 4e is a magnetic layer having a non-granular structure. The magnetic particles, which constitute the first to fifth magnetic layers 4a to 4e, are continuous columnar crystals. The fourth magnetic layer 4d and the fifth magnetic layer 4e are in contact with each other. The first to fifth magnetic layers 4a to 4e are coupled ferromagnetically. The following relations are satisfied where Ku$_5$ is a magnetic anisotropic constant of the fifth magnetic layer 4e, Ms$_5$ is a saturation magnetization of the fifth magnetic layer 4e, and t$_5$ is a film thickness of the fifth magnetic layer 4e, Ku$_4$>Ku$_5$, and Ms$_4$×t$_4$>Ms$_5$×t$_5$.

Disposing the fifth magnetic layer 4e having the above features is preferable in terms of producing the magnetic recording medium that can realize the high thermal fluctuation characteristics and the high write-ability (easiness of recording). Further, when relations Ku$_3$>Ku$_5$ and Ms$_3$×t$_3$<Ms$_5$×t$_5$ are satisfied, it becomes possible to produce the magnetic recording medium that can realize the higher thermal fluctuation characteristics and the higher write-ability (easiness of recording).

The fifth magnetic layer 4e is made to be a non-granular structure that does not contain the oxide or the like. As illustrated in FIG. 2, the magnetic particles 42 in the fifth magnetic layer 4e are epitaxially grown to be columnar from the magnetic particles 42 in the first magnetic layer 4a. In this case, it is preferable that the magnetic particles of the first magnetic layer 4a, the second magnetic layer 4b, the third magnetic layer 4c, the fourth magnetic layer 4d, and the fifth magnetic layer 4e are epitaxially grown to be columnar in one-to-one correspondence in each magnetic layer.

Because the magnetic particles 42 of the fifth magnetic layer 4e are grown from the magnetic particles 42 in the first magnetic layer 4a by the epitaxial growth, the magnetic particles 42 of the fifth magnetic layer 4e can be micronized and the crystallinity and orientation can be further improved, which is desirable.

In the embodiment, although it is required that the magnetic anisotropic constant Ku$_5$, the saturation magnetization Ms$_5$, and the film thickness t$_5$ of the fifth magnetic layer 4e are made to be in predetermined ranges, it is possible to form the magnetic layer with reference to materials illustrated in FIGS. 3 and 4 when CoCrPt based magnetic particles are used, for example.

As for the material suitable for the fifth magnetic layer 4e, other than the CoCrPt based material, a CoCrPtB based material, a CoCrPtBNd based material, a CoCrPtTaNd based material, a CoCrPtNb based material, a CoCrPtBW based material, a CoCrPtMo based material, a CoCrPtCuRu based material, a CoCrPtRe based material, or the like may be used.

It is preferable that Ms$_5$ of the fifth magnetic layer 4e is in a range of from 950 to 250 emu/cc and Ku$_5$ of the fifth magnetic layer 4e is in a range of from 8×10$^6$ to 1×10$^6$ erg/cc. It is undesirable that the value of Ku$_5$ or Ms$_5$ is equal to or less than the above range because this results in easy occurrence of the magnetization reversal, giving rise to problems concerning a reduction in Hn and deterioration in the thermal fluctuation characteristics. Further, if the value of Ku$_5$ or Ms$_5$ exceeds the above range, it is difficult to easily undergo the magnetization reversal with respect to the magnetic field of the head, and the write-ability (easiness of recording) decreases.

The protective layer 5 serves to prevent the perpendicular magnetic layer 4 from being corroded and also serves to prevent damages to the surface of the medium when the magnetic head contacts the medium. Conventionally known materials may be used as the material of the protective layer 5. For example, materials containing a hard carbon film may be used.

It is preferable that the thickness of the protective layer 5 is made to be in a range of from 1 nm to 10 nm in view of high recording density because the distance between the head and the medium can be made small.

It is preferable to use lubricants agents such as a perfluoropolyether, fluorinated alcohol and fluorinated carboxylic acid for the lubricant layer 6.

When producing a magnetic recording medium having the above structure, the soft magnetic underlayer 2, the orientation control layer 3 and the perpendicular magnetic layer 4 are sequentially formed on the nonmagnetic substrate 1 by, for example, a sputtering method, a vacuum vapor deposition method, an ion plating method, or the like. Then, the protective layer 5 is formed by, for example, a plasma CVD method, an ion beam method or the sputtering method.

Figure 5:
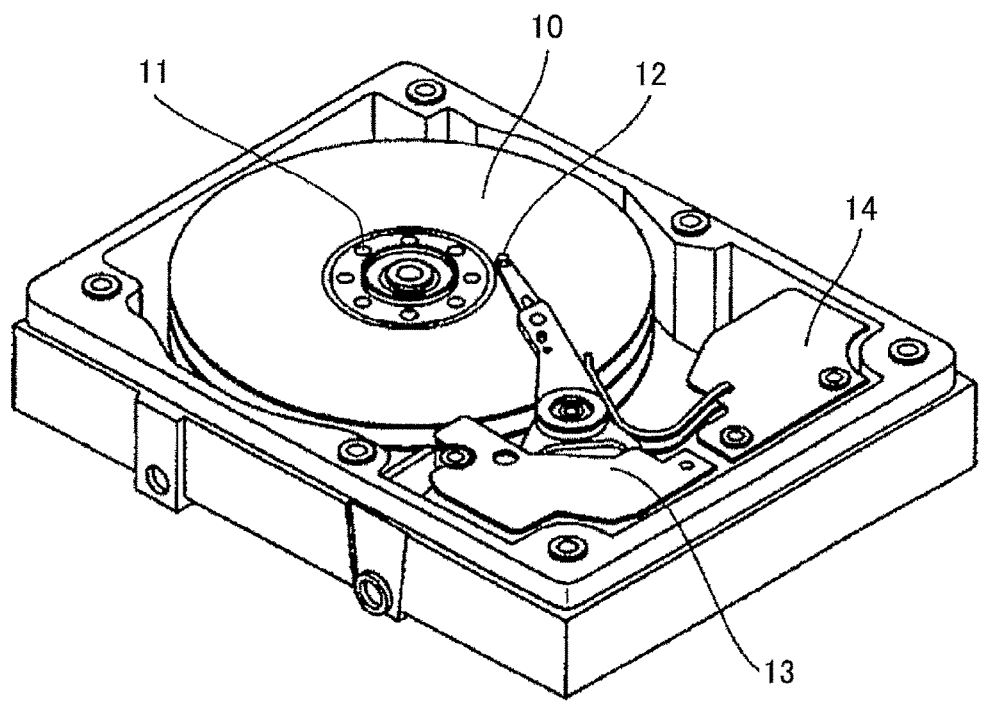
FIG. 5 is a schematic diagram illustrating a magnetic recording and reproducing apparatus according to the embodiment of the present invention.

FIG. 5 is a schematic diagram illustrating an example of a magnetic recording and reproducing apparatus according to the embodiment. This magnetic recording and reproducing apparatus illustrated in FIG. 5 includes a magnetic recording medium 10 according to the embodiment, a medium driving part 11 that drives the magnetic recording medium 10 to rotate, a magnetic head 12 that records and reproduces information in and from the magnetic recording medium 10, a head driving part 13 that moves the magnetic head 12 relative to the magnetic recording medium 10, and a recording and reproducing signal processing system 14. The recording and reproducing signal processing system 14 can process data input from the outside and transmit a recording signal to the magnetic head 12, and can process a reproducing signal from the magnetic head 12 and transmit the data to the outside. A magnetic head, including a Giant MagnetoResistance (GMR) element utilizing a GMR effect as a reproducing element, suitable for the high recording density can be used as the magnetic head 12 used in the magnetic recording and reproducing apparatus according to the embodiment.

WORKING EXAMPLES

Working Examples 1 to 4 and Comparative Examples 1 to 6

Magnetic recording media according to working examples 1 to 4 and comparative examples 1 to 6 were produced by a manufacturing method described below.

A cleaned glass substrate (manufactured by HOYA Corporation, outer diameter: 2.5 inches) was put in a film forming chamber of a DC magnetron sputtering apparatus (trade name: C-3040, manufactured by Anelva Corporation), and the film forming chamber was evacuated until the ultimate vacuum reached $1 \times 10^{-5}$ Pa. After that, an adhesion layer having a thickness of 10 nm was formed (deposited) on the glass substrate by using a Cr target. Using a target of Co-20Fe-5Zr-5Ta (content of Fe: 20 at. %, content of Zr: 5 at. %, content of Ta 5 at. %, and the rest: Co), a soft magnetic layer having a thickness of 25 nm was formed at a substrate temperature of 100° C. or lower. Then, a Ru layer having a thickness of 0.7 nm was formed on the soft magnetic layer and then, a soft magnetic layer having a thickness of 25 nm of Co-20Fe-5Zr-5Ta was formed on the Ru layer. Thereby, a soft magnetic underlayer 2 was made.

Using a Ni-6W {content of W: 6 at. % and the rest: Ni} target and a Ru-target, films were formed in thicknesses of 5 nm and 20 nm respectively on the soft magnetic underlayer 2 in this order to make an orientation control layer 3.

A perpendicular magnetic layer, formed by magnetic layers and the like illustrated in tables 1 to 3, was formed on the orientation control layer 3 by a sputtering method under an argon gas pressure of 2 Pa.

TABLE 2

| | FIRST MAGNETIC LAYER | | | | EXCHANGE COUPLING CONTROL LAYER 1 | | SECOND MAGNETIC LAYER | | | | EXCHANGE COUPLING CONTROL LAYER 2 | |
|---|---|---|---|---|---|---|---|---|---|---|---|---|
| | COMPOSITION | $Ku_1$ ($\times 10^6$ erg/cc) | $Ms_1$ (emu/cc) | $t_1$ (nm) | COMPOSITION | t (nm) | COMPOSITION | $Ku_2$ ($\times 10^6$ erg/cc) | $Ms_2$ (emu/cc) | $t_2$ (nm) | COMPOSITION | t (nm) |
| WORKING EXAMPLE 1 | 92(71Co7Cr22Pt)-8TiO$_2$ | 8.8 | 800 | 4 | 50Ru50Co | 0.3 | 92(74Co10Cr16Pt)-8TiO$_2$ | 6.7 | 700 | 4 | 50Ru50Co | 0.3 |
| WORKING EXAMPLE 2 | 92(71Co7Cr22Pt)-8TiO$_2$ | 8.8 | 800 | 4 | 50Ru50Co | 0.3 | 92(74Co10Cr16Pt)-8TiO$_2$ | 6.7 | 700 | 4 | 50Ru50Co | 0.3 |
| WORKING EXAMPLE 3 | 92(71Co7Cr22Pt)-8TiO$_2$ | 8.8 | 800 | 4 | 50Ru50Co | 0.3 | 92(74Co10Cr16Pt)-8TiO$_2$ | 6.7 | 700 | 4 | 50Ru50Co | 0.3 |
| WORKING EXAMPLE 4 | 92(71Co7Cr22Pt)-8TiO$_2$ | 8.8 | 800 | 4 | 50Ru50Co | 0.3 | 92(74Co10Cr16Pt)-8TiO$_2$ | 6.7 | 700 | 4 | 50Ru50Co | 0.3 |
| COMPARATIVE EXAMPLE 1 | 92(71Co7Cr22Pt)-8TiO$_2$ | 8.8 | 800 | 4 | 50Ru50Co | 0.3 | 92(74Co10Cr16Pt)-8TiO$_2$ | 6.7 | 700 | 4 | 50Ru50Co | 0.3 |
| COMPARATIVE EXAMPLE 2 | 92(71Co7Cr22Pt)-8TiO$_2$ | 8.8 | 800 | 4 | 50Ru50Co | 0.3 | 92(74Co10Cr16Pt)-8TiO$_2$ | 6.7 | 700 | 4 | 50Ru50Co | 0.3 |
| COMPARATIVE EXAMPLE 3 | 92(71Co7Cr22Pt)-8TiO$_2$ | 8.8 | 800 | 4 | 50Ru50Co | 0.3 | 92(74Co10Cr16Pt)-8TiO$_2$ | 6.7 | 700 | 4 | 50Ru50Co | 0.3 |
| COMPARATIVE EXAMPLE 4 | 92(71Co7Cr22Pt)-8TiO$_2$ | 8.8 | 800 | 4 | 50Ru50Co | 0.3 | 92(74Co10Cr16Pt)-8TiO$_2$ | 6.7 | 700 | 4 | 50Ru50Co | 0.3 |
| COMPARATIVE EXAMPLE 5 | 92(71Co7Cr22Pt)-8TiO$_2$ | 8.8 | 800 | 4 | 50Ru50Co | 0.3 | 92(74Co10Cr16Pt)-8TiO$_2$ | 6.7 | 700 | 4 | 50Ru50Co | 0.3 |
| COMPARATIVE EXAMPLE 6 | 92(71Co7Cr22Pt)-8TiO$_2$ | 8.8 | 800 | 4 | 50Ru50Co | 0.3 | 92(74Co10Cr16Pt)-8TiO$_2$ | 6.7 | 700 | 4 | 50Ru50Co | 0.3 |

TABLE 3

| | THIRD MAGNETIC LAYER | | | | EXCHANGE COUPLING CONTROL LAYER 3 | | FOURTH MAGNETIC LAYER | | | | EXCHANGE COUPLING CONTROL LAYER 2 | |
|---|---|---|---|---|---|---|---|---|---|---|---|---|
| | COMPOSITION | $Ku_3$ ($\times 10^6$ erg/cc) | $Ms_3$ (emu/cc) | $t_3$ (nm) | COMPOSITION | t (nm) | COMPOSITION | $Ku_4$ ($\times 10^6$ erg/cc) | $Ms_4$ (emu/cc) | $t_4$ (nm) | COMPOSITION | t (nm) |
| WORKING EXAMPLE 1 | 92(64Co15Cr21Pt)-8TiO$_2$ | 3.8 | 450 | 4 | — | — | 92(75Co7Cr18Pt)-8TiO$_2$ | 7.1 | 750 | 4 | — | — |
| WORKING EXAMPLE 2 | 92(64Co15Cr21Pt)-8TiO$_2$ | 3.8 | 450 | 4 | — | — | 92(77Co10Cr13Pt)-8TiO$_2$ | 5.5 | 650 | 4 | — | — |
| WORKING EXAMPLE 3 | 92(64Co15Cr21Pt)-8TiO$_2$ | 3.8 | 450 | 4 | — | — | 92(75Co7Cr18Pt)-8TiO$_2$ | 7.1 | 750 | 4 | — | — |

TABLE 3-continued

| | | | | | | | | | | | | |
|---|---|---|---|---|---|---|---|---|---|---|---|---|
| WORKING EXAMPLE 4 | 92(64Co15Cr21Pt)-8TiO$_2$ | 3.8 | 450 | 4 | — | — | 92(75Co7Cr18Pt)-8TiO$_2$ | 7.1 | 750 | 4 | — | — |
| COMPARATIVE EXAMPLE 1 | 92(76Co12Cr12Pt)-8TiO$_2$ | 3.8 | 600 | 4 | — | — | — | — | — | — | — | — |
| COMPARATIVE EXAMPLE 2 | 92(77Co15Cr8Pt)-8TiO$_2$ | 3.8 | 400 | 4 | — | — | — | — | — | — | — | — |
| COMPARATIVE EXAMPLE 3 | 92(75Co7Cr18Pt)-8TiO$_2$ | 3.8 | 750 | 4 | — | — | — | — | — | — | — | — |
| COMPARATIVE EXAMPLE 4 | 92(64Co15Cr21Pt)-8TiO$_2$ | 3.8 | 450 | 4 | — | — | 92(77Co15Cr8Pt)-8TiO$_2$ | 2.0 | 400 | 4 | — | — |
| COMPARATIVE EXAMPLE 5 | 92(64Co15Cr21Pt)-8TiO$_2$ | 3.8 | 450 | 4 | 50Ru50Co | 0.3 | 92(75Co7Cr18Pt)-8TiO$_2$ | 7.1 | 750 | 4 | — | — |
| COMPARATIVE EXAMPLE 6 | 92(64Co15Cr21Pt)-8TiO$_2$ | 3.8 | 450 | 4 | 50Ru50Co | 0.3 | 92(75Co7Cr18Pt)-8TiO$_2$ | 7.1 | 750 | 4 | 50Ru50Co | 0.3 |

| | FIFTH MAGNETIC LAYER | | | | | | | |
|---|---|---|---|---|---|---|---|---|
| | COMPOSITION | Ku$_5$ (×10$^6$ erg/cc) | Ms$_5$ (emu/cc) | t$_5$ (nm) | OW (dB) | THERMAL FLUCTUATION (%) | ATI (order) | FTI (order) | COMPRE-HENSIVE EVALUATION |
| WORKING EXAMPLE 1 | 62Co12Cr18Pt8B | 3.3 | 500 | 4 | 32.5 | 8.4 | 1.51 | 0.82 | ○ |
| WORKING EXAMPLE 2 | 62Co12Cr18Pt8B | 3.3 | 500 | 4 | 34.8 | 9.3 | 1.67 | 0.95 | ○ |
| WORKING EXAMPLE 3 | 58Co12Cr22Pt8B | 3.8 | 500 | 4 | 32.7 | 8.2 | 1.48 | 0.80 | ○ |
| WORKING EXAMPLE 4 | 68Co8Cr18Pt8B | 4.2 | 500 | 4 | 33.2 | 8.0 | 1.60 | 0.87 | ○ |
| COMPARATIVE EXAMPLE 1 | 62Co12Cr18Pt8B | 3.3 | 500 | 4 | 32.7 | 10.6 | 1.98 | 1.34 | × |
| COMPARATIVE EXAMPLE 2 | 62Co12Cr18Pt8B | 3.3 | 500 | 4 | 35.1 | 12.9 | 2.54 | 1.76 | × |
| COMPARATIVE EXAMPLE 3 | 62Co12Cr18Pt8B | 3.3 | 500 | 4 | 28.9 | 8.5 | 1.54 | 0.88 | × |
| COMPARATIVE EXAMPLE 4 | 62Co12Cr18Pt8B | 3.3 | 500 | 4 | 29.6 | 10.3 | 1.87 | 1.25 | × |
| COMPARATIVE EXAMPLE 5 | 62Co12Cr18Pt8B | 3.3 | 500 | 4 | 33.7 | 9.8 | 1.89 | 1.13 | × |
| COMPARATIVE EXAMPLE 6 | 62Co12Cr18Pt8B | 3.3 | 500 | 4 | 35.2 | 11.6 | 2.21 | 1.35 | × |

Next, a protective layer 5 having a film thickness of 3.0 nm was formed by an ion beam method. Next, a lubricant layer 6 made of perfluorinated polyether was formed by a dipping method, and a magnetic recording medium was produced.

Write-ability (OW) of obtained magnetic recording media were evaluated. Read Write Analyzer RWA-1632 and Spin Stand S1701MP manufactured by Guzik Technical Enterprises in the United States were used to measure and evaluate the overwrite characteristics. As the head, a head using a single-pole magnetic pole for writing and a TMR element in the reproducing section was used. First, 750 kFCI signals were written and then, 100 kFCI signals were overwritten. Then, high-frequency components were extracted by a frequency filter to evaluate the data writing ability based on its residual ratio.

After information was written in a recording density of 50 kFCI under a condition at 70° C., an attenuation rate of an output with respect to a reproduced output one second after the information was written was calculated based on the equation of (So−S)×100/(So) to evaluate thermal fluctuation characteristics. In this equation, "So" represents a reproduced output of when one second passed after the information was written. "S" represents a reproduced output of when 10000 seconds passed after the information was written.

Further, ATI and FTI were similarly measured using Read Write Analyzer RWA-1632 and Spin Stand S1701MP manufactured by Guzik Technical Enterprises in the United States. Table 3 illustrates results.

Further, table 3 illustrates a comprehensive evaluation based on measurement results of OW, thermal fluctuation, ATI, and FTI for each example. Because there is a trade-off relationship between these measurement results, it is necessary to comprehensively evaluate the characteristics of the magnetic recording media based on these measurement results. A magnetic recording medium, whose OW is 32.5 dB or higher, thermal fluctuation is 9.3% or less, ATI is 1.67 order or less, and FTI is 0.95 order or less, is evaluated as an excellent magnetic recording medium (○) and others are disapproved (x).

As illustrated in table 3, the magnetic recording media according to working examples 1 to 4 can improve ATI and FTI while maintaining OW. As illustrated by the results of the recording media of working examples 3 and 4, it is effective even when the magnetic anisotropic constant Ku$_5$ and the saturation magnetization Ms$_5$ of the fifth magnetic layer are changed. Comparative example 1 is a magnetic recording medium having a conventional structure serving as a benchmark. As illustrated by the result of the recording medium of comparative example 2, when the magnetic anisotropic constant Ku$_3$ of the third magnetic layer is decreased simply, OW is improved but ATI and FTI get worse. As illustrated by the result of the recording medium of comparative example 3, when the magnetic anisotropic constant Ku$_3$ of the third magnetic layer is increased simply, ATI and FTI are improved but OW gets worse. As illustrated by the result of the recording medium of comparative example 4, when the saturation magnetization Ms$_4$ and the magnetic anisotropic constant Ku$_4$ of the fourth magnetic layer are low, magnetization reversal does not occur smoothly and desired effects cannot be obtained. As illustrated by the result of the recording medium of comparative example 5, when the exchange coupling control layer is inserted between the third magnetic layer and the fourth magnetic layer, OW is improved but ATI and FTI get worse. As illustrated by the result of the recording medium of comparative example 6, when the exchange coupling control layer is inserted between the third magnetic layer and the fourth magnetic layer, and the exchange coupling control layer is inserted between the fourth magnetic layer and the fifth magnetic layer, OW is improved but ATI and FTI get worse.

As described above, according to working examples 1 to 4 of the embodiment, a magnetic recording medium which has excellent electromagnetic conversion characteristics and can comply with high-density recording was obtained.

Further, the present disclosure is not limited to these embodiments, but various variations and modifications may be made without departing from the scope of the present invention.

What is claimed is:

1. A magnetic recording medium comprising:
a non-magnetic substrate on which at least a soft magnetic underlayer, an orientation control layer that controls an orientation of a layer that is located directly on the orientation control layer, a perpendicular magnetic layer having a magnetization easy axis that is mainly oriented perpendicular to the non-magnetic substrate, and a protective layer are disposed,
wherein the perpendicular magnetic layer includes a first magnetic layer, a second magnetic layer, a third magnetic layer, and a fourth magnetic layer from a side of the substrate in this order,
wherein the first magnetic layer, the second magnetic layer, the third magnetic layer, and the fourth magnetic layer are magnetic layers having a granular structure,
wherein magnetic particles, which constitute the first magnetic layer, the second magnetic layer, the third magnetic layer, and the fourth magnetic layer, are continuous columnar crystals,
wherein a first exchange coupling control layer is disposed between the first magnetic layer and the second magnetic layer,
wherein a second exchange coupling control layer is disposed between the second magnetic layer and the third magnetic layer,
wherein the third magnetic layer and the fourth magnetic layer are in contact with each other,
wherein the first magnetic layer, the second magnetic layer, the third magnetic layer, and the fourth magnetic layer are coupled ferromagnetically, and
wherein following relations are satisfied where $Ku_i$ is a magnetic anisotropic constant of an i-th magnetic layer, $Ms_i$ is a saturation magnetization of the i-th magnetic layer, and $t_i$ is a film thickness of the i-th magnetic layer, $$Ku_1 > Ku_2,$$

$$Ku_2 > Ku_3,$$

$$Ms_1 \times t_1 > Ms_2 \times t_2,$$

$$Ms_2 \times t_2 > Ms_3 \times t_3,$$

$$Ku_3 < Ku_4, \text{ and}$$

$$Ms_3 \times t_3 < Ms_4 \times t_4.$$

2. The magnetic recording medium according to claim 1,
wherein $Ms_1$ is in a range of from 1200 to 500 emu/cc,
wherein $Ku_1$ is in a range of from $12 \times 10^6$ to $5 \times 10^6$ erg/cc,
wherein $Ms_2$ is in a range of from 1100 to 400 emu/cc,
wherein $Ku_2$ is in a range of from $11 \times 10^6$ to $4 \times 10^6$ erg/cc,
wherein $Ms_3$ is in a range of from 1000 to 300 emu/cc,
wherein $Ku_3$ is greater than or equal to $4 \times 10^6$ and less than $9 \times 10^6$ erg/cc,
wherein $Ms_4$ is in a range of from 900 to 200 emu/cc,
wherein $Ku_4$ is greater than $4 \times 10^6$ and less than or equal to $9 \times 10^6$ erg/cc, and
wherein $t_1$, $t_2$, $t_3$, and $t_4$ are in a range of from 1 to 10 nm.

3. The magnetic recording medium according to claim 1, further comprising:
a fifth magnetic layer between the fourth magnetic layer and the protective layer,
wherein the fifth magnetic layer is a magnetic layer having a non-granular structure,
wherein magnetic particles, which constitute the first magnetic layer, the second magnetic layer, the third magnetic layer, the fourth magnetic layer, and the fifth magnetic layer, are continuous columnar crystals,
wherein the fourth magnetic layer and the fifth magnetic layer are in contact with each other,
wherein the first magnetic layer, the second magnetic layer, the third magnetic layer, the fourth magnetic layer, and the fifth magnetic layer are coupled ferromagnetically, and
wherein following relations are satisfied where $Ku_5$ is a magnetic anisotropic constant of the fifth magnetic layer, $Ms_5$ is a saturation magnetization of the fifth magnetic layer, and $t_5$ is a film thickness of the fifth magnetic layer, $$Ku_4 > Ku_5, \text{ and}$$

$$Ms_4 \times t_4 > Ms_5 \times t_5.$$

4. The magnetic recording medium according to claim 3, wherein following relations are satisfied, $$Ku_3 > Ku_5, \text{ and}$$

$$Ms_3 \times t_3 < Ms_5 \times t_5.$$

5. The magnetic recording medium according to claim 3,
wherein $Ms_5$ is in a range of from 950 to 250 emu/cc,
wherein $Ku_5$ is in a range of from $8 \times 10^6$ to $1 \times 10^6$ erg/cc, and
wherein $t_5$ is in a range of from 1 to 10 nm.

6. A magnetic recording and reproducing apparatus comprising:
the magnetic recording medium according to claim 1; and
a magnetic head configured to record and reproduce information in and from the magnetic recording medium.

* * * * *